(12) United States Patent
Hansen

(10) Patent No.: US 12,031,352 B2
(45) Date of Patent: Jul. 9, 2024

(54) PENDULUM MASS DAMPER

(71) Applicant: SOH WIND TUNNELS APS, Copenhagen (DK)

(72) Inventor: Svend Ole Hansen, Copenhagen (DK)

(73) Assignee: SOH WIND TUNNELS APS (DK)

( * ) Notice: Subject to any disclaimer, the term of this patent is extended or adjusted under 35 U.S.C. 154(b) by 170 days.

(21) Appl. No.: 17/612,307

(22) PCT Filed: May 20, 2020

(86) PCT No.: PCT/EP2020/064146
§ 371 (c)(1),
(2) Date: Nov. 18, 2021

(87) PCT Pub. No.: WO2020/239590
PCT Pub. Date: Dec. 3, 2020

(65) Prior Publication Data
US 2022/0228393 A1    Jul. 21, 2022

(30) Foreign Application Priority Data

May 24, 2019    (DK) .............................. PA 2019 00632

(51) Int. Cl.
*E04H 9/02*    (2006.01)
*F16F 7/104*    (2006.01)
(Continued)

(52) U.S. Cl.
CPC ........... *E04H 9/0215* (2020.05); *F16F 7/104* (2013.01); *E04B 1/98* (2013.01); *F03D 13/20* (2016.05);
(Continued)

(58) Field of Classification Search
CPC ..... E04H 9/0215; E04H 9/0235; E04H 9/021; E04B 1/98; F16F 7/1028; F16F 7/104;
(Continued)

(56) References Cited

U.S. PATENT DOCUMENTS 1,761,322 A * 6/1930 Wells ...................... E04H 9/021
  52/167.2
5,272,847 A * 12/1993 Abiru .................... E04H 9/0215
  52/167.2
(Continued)

FOREIGN PATENT DOCUMENTS

EP    1 008 747 A2    12/1999
JP    S61-274134 A    12/1986
(Continued)

OTHER PUBLICATIONS

Tuned Mass Damper Inverted Pendulum to Reduce Offshore Wind Turbine Vibrations (https://link.springer.com/chapter/10.1007/978-3-319-09918-7_34, Jan. 1, 2014). (Year: 2014).*
(Continued)

*Primary Examiner* — Brian E Glessner
*Assistant Examiner* — Daniel J Kenny
(74) *Attorney, Agent, or Firm* — Ware, Fressola, Maguire & Barber LLP

(57) ABSTRACT

A pendulum mass damper is directed to damping oscillation of tall buildings, towers or similar flexible structures requiring a low frequency tuned mass damper (TMD) for reducing a e.g. wind or earthquake induced displacement response of the structure. A mass (1) is balanced by a first spring system (2a, 2b, 2c) and supported by a carrying part (4) to maintain a vertical position, the carrying part (4) carrying the mass in the vertical direction extends between the mass and a position (C) below the mass, i.e. the weight of the mass is carried or supported from or at a point or level below the mass, wherein the mass at the position (C) below the mass is fixed and/or connected to a unit (5) constituting a base of a supporting system for the mass which unit is floating i.e. the unit can move either horizontally or both horizontally and vertically.

14 Claims, 6 Drawing Sheets

Figure 1:
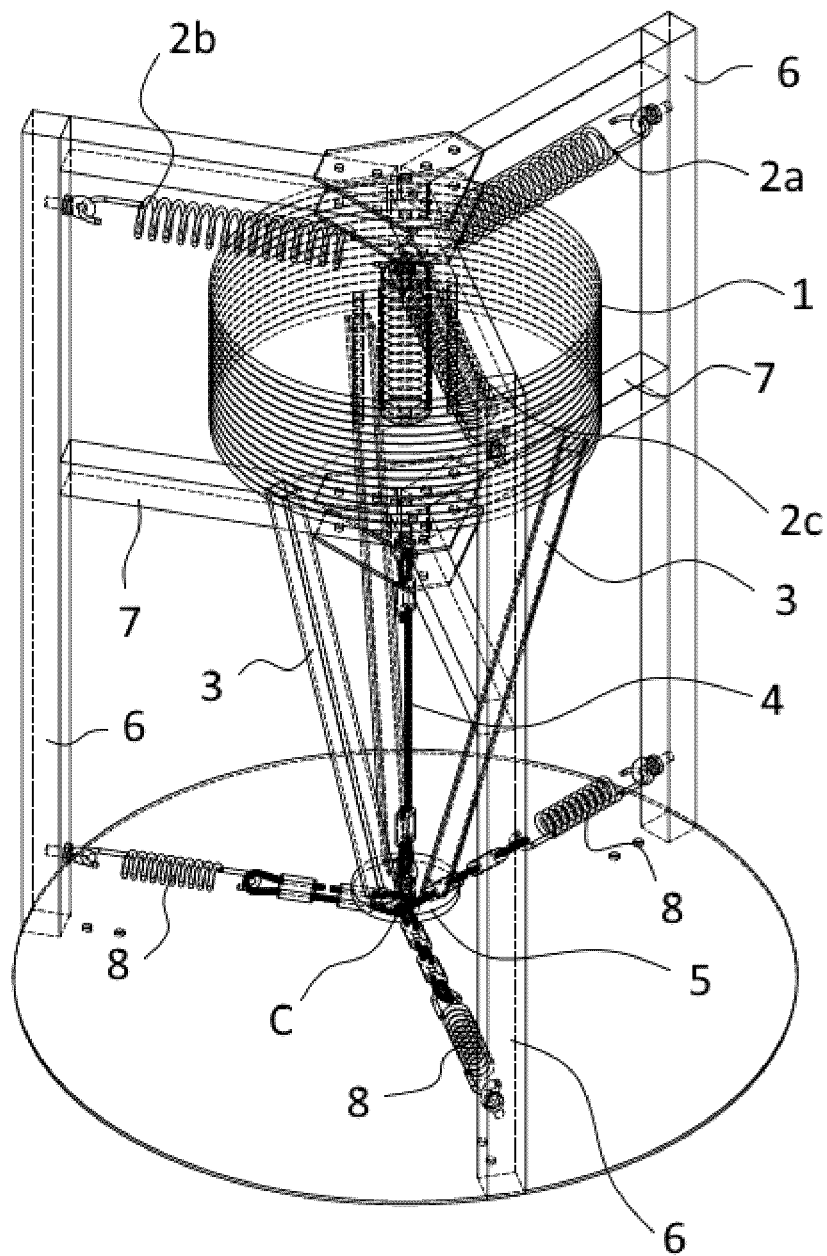

(51) Int. Cl.
*E04B 1/98* (2006.01)
*F03D 13/20* (2016.01)
(52) U.S. Cl.
CPC ... *F05B 2260/502* (2013.01); *F05B 2260/964* (2013.01)
(58) Field of Classification Search
CPC ............... F03D 13/20; F05B 2260/502; F05B 2260/964
See application file for complete search history.

(56) References Cited

U.S. PATENT DOCUMENTS

| | | | | |
|---|---|---|---|---|
| 5,915,508 | A * | 6/1999 | Lai | F16F 15/085 52/167.2 |
| 6,045,090 | A * | 4/2000 | Krysinsky | B64C 27/001 244/17.27 |
| 8,336,687 | B2 * | 12/2012 | Kawabata | F03D 80/00 415/908 |
| 2001/0032420 | A1 * | 10/2001 | Chen | E04H 9/0237 52/167.3 |

FOREIGN PATENT DOCUMENTS

| | | |
|---|---|---|
| JP | H03-121329 A | 5/1991 |
| JP | H05-12791 U | 2/1993 |
| JP | 106-56534 U | 8/1994 |
| JP | H07 54520 A | 2/1995 |
| JP | H11 36664 A | 2/1999 |
| JP | 2011 069104 A | 4/2011 |
| JP | 2013 245765 A | 12/2013 |
| JP | 2001349094 A | 12/2021 |

OTHER PUBLICATIONS

International Search Report, PCT/EP2020/064146, mailed Sep. 23, 2020, 4 pages.
Written Opinion of the International Search Authority, PCT/EP2020/064146, mailed Sep. 23, 2020, 6 pages.
Danish Patent & TM Office, Search Report completed Oct. 18, 2019 for application No. PA 2019 00632, 4 pages.
Bibliographic Data for publication No. EP 1 008 747 A2 (Foreign Patent Document Cite No. 2), including English Abstract, 1 page.
Pedro V.B. Guimaraes et al., "Vibration control of an offshore wind turbine modeled as an inverted pendulum," 11th Int'l Conf. on Vibration Problems, Lisbon, Portugal, Sep. 9-12, 2013, pp. 1-10, 10 pages.
Communication under Rule 71(3) EPC, Registered letter, EPO Form 2004C 07.20CXP, dated Aug. 29, 2023, Intention to Grant, EP Application No. 20 727 981.1-1005, including newly cited prior art (see p. 5), 5 pages.

* cited by examiner

PENDULUM MASS DAMPER

The present invention relates to a tuned pendulum mass damper damping oscillation of tall buildings, towers or similar flexible structures. In particular the pendulum mass damper is directed to applications requiring a low frequency tuned mass damper (TMD) reducing a e.g. wind or earthquake induced displacement response of the structure.

BACKGROUND ART

High buildings and other structures move to a certain extent. During seismic events or strong winds, the tallest buildings can sway up to almost a meter on each side. The magnitude of movement of any induced vibration may cause structural overloading and/or severe discomfort, airsickness, nausea or even shock to the building occupants. Thus, lateral deflection (also known as sway or drift), vibration and building acceleration are significant criteria that structural engineers carefully assess in the design of high-rise structures. Also, it may be relevant to damp vibrations of tall chimneys and wind turbine towers, where the large vibrations to be dampened occur at lower wind velocities due to vortex shedding.

There are several ways of reducing sway and vibration of structures in order to avoid overloading and to reach an acceptable level of human comfort. First, vertical elements such as columns and walls may be stiffened by providing larger dimensions or thicknesses. Another possibility is to "tune the building" by using a Tuned Mass Damper or TMD. A Tuned Mass Damper (TMD), also called a "harmonic absorber", is a device mounted to a specific location in a structure, so as to reduce the amplitude of vibration to an acceptable level whenever a strong lateral force such as an earthquake or high wind hit.

Civil structures like high-rise buildings, or industrial applications such as wind turbines is now commonly exceeding 100 m in height and as the natural frequency of such structures decrease with the height, a tuned mass damper able to handle a low frequency is more often required.

A TMD can either be included during the initial concept design of a building to reduce the size of vertical or horizontal elements or as a retrofit to an existing structure where vibration and acceleration issues are determined.

Some of the major considerations when installing a TMD, is the location of the TMD and effect of the chosen location to space allocation.

A conventional simple gravity pendulum has a natural frequency $$n_e = \frac{1}{2\pi}\sqrt{g/L}$$

and, therefore, the only parameter affecting the motion, besides the gravitational acceleration, is the pendulum length L and the lower the aimed frequency, the longer the required length of the pendulum. This represents a serious limitation whenever a pendulum is used as tuned mass damper. Indeed, within the band of natural frequencies which generally characterize slender structures such as high-rise buildings and wind turbine towers, the required length L of a pendulum working as tuned mass damper may be greater than a typical story height.

A well-known pendulum tuned mass damper is the one built for Taipei 101 comprising a spherical Tuned Mass Damper weighing approximately 730 tons and costing around $4 million, the spherical mass is suspended in cables inside a metal frame allowing the mass to swing in all directions, however, the TMD reaches from the $87^{th}$ to the $91^{st}$ floor, i.e. around 15 meters in height.

US 2017/0328058 discloses a pendulum damper for damping undesired vibrations in vibration sensitive systems such as tall buildings and towers, in particular wind turbines. A pendulum damper according to this document comprises a damper mass suspended from a top-point in a cable or the like, and a spring device installed in connection with the damper mass. The spring device is installed in such a way that its overall spring force acts essentially in the vertical direction allowing an adjustment of the damper frequency without changing the pendulum.

SUMMARY OF INVENTION

The present invention relates to a tuned mass damper, and, more particularly, to a pendulum tuned mass damper capable of damping a dynamic response of a variety of structural systems vibrating horizontally at low frequencies.

The objective of the present invention is to provide a tuned pendulum mass damper, which is compact, maintenance-free and versatile.

A further objective of the invention is to obtain an acceptable serviceability or comfort for users of the structures, also the invention will be efficient for obtaining an acceptable safety level avoiding exceedance of the ultimate limit state and fatigue limit state of the structure.

The present invention may in particular relate to a suspended inverted pendulum mass damper.

According to one aspect of the invention, the invention relates to a pendulum mass damper for damping oscillations of a structure comprising a mass (1) balanced by a first spring system (2a, 2b, 2c) and supported by a carrying part (4) to maintain a vertical position, the carrying part (4) carrying the mass (1) in the vertical direction extends between the mass (1) and a position (C) below the mass (1), i.e. the weight of the mass (1) is carried or supported from or at a point or level below the mass (1), wherein the mass (1) at the position (C) below the mass is fixed and/or connected to a unit (5) constituting a base of a supporting system for the mass (1) which unit (5) is floating i.e. the unit (5) can move either horizontally or both horizontally and vertically.

When the lower end of the pendulum mass damper can move horizontally, the pendulum becomes more stable while still working at low frequencies. In principle the effective length of the inverted pendulum is extended, meaning that the point of rotation is situated in an imaginary point below the damper application. The increased pendulum length leads to a reduced angle of rotation of the pendulum when a fixed horizontal displacement of the pendulum mass is sought. A reduction of the angle of rotation will improve the stability performance and effective vibrating mass of the low-frequency damper application. Due to the difference in the lower and upper end spring system, the mass damper will have two vibrating modes in each horizontal direction. The first mode is the main objective of this application. However, the spring configuration can be selected in order to tune both the first and second mode. This can potentially be utilized to damp two different structural modes with only one damper configuration.

According to any embodiment of the invention, the unit (5) may be constituted of a floating part, such as a plate or another suitable shape, e.g. being balanced by flexible parts such as a second spring system (8).

According to any embodiment of the invention, the carrying part (4) may comprise a central carrying part (4) extending from a suspension frame (7) to the position (C).

According to any embodiment of the invention, the first spring system (2a, 2b, 2c) balances the mass (1) horizontally and is positioned above, below or at approximately the same vertical level as the mass (1).

According to any embodiment of the invention, the first spring system (2a, 2b, 2c) balances the mass (1) horizontally and is attached or fixed at the central axis. According to this embodiment, the first spring system (2a, 2b, 2c) may be attached to or fixed above the vertical level of the mass (1) within a distance of the top of the mass being less than 20%, e.g. less than 10% or e.g. less than 5%, from the total length of the pendulum measured from the central point (C) to the fastening points or fastening level (F) of the springs.

When the spring system is attached to the center axis above the mass or close to the center axis instead of to the perimeter of the mass, the damping system may be made more compact which is an advantage as the complete damping system then occupies less space horizontally. There has been a prejudice in the industry against placing a spring system above the mass when constructing an inverted pendulum, probably because it is necessary to extend the central axis above the mass, thereby increasing the length of the pendulum, however, when the first spring system is fixed or attached to the central axis above the mass, preferably close to the mass, the system becomes both stable and relatively compact.

In general and independently of whether the mass 1 is supported by a floating unit 5 or supported by a joint being stationary relative to the frame 6 or structure, a first spring system 2a, 2b, 2c may advantageously be fixed to a point at, or close to, the center line through the mass 1 above the mass 1. A second springs system may according to such a solution be fixed to a point at, or close to the center line through the mass 1 below the mass.

According to any embodiment of the invention, the first spring system (2a, 2b, 2c) may comprise at least 3 springs or at least balances the mass in three directions.

According to any embodiment of the invention, the carrying part (4) may comprise a central carrying part (4) in form of one or more cables or similar extending from a suspension frame (7) to the position (C), or in form of a rigid beam e.g. made of steel or similarly rigid material extending from the mass (1) to the position (C).

According to any embodiment of the invention, the carrying part (4) also may comprise support parts (3) e.g. in form of one or more rigid beams or similar part(s) extending from the mass (1) to the unit (5) positioned below the mass (1) which support part(s) may be resting on the unit (5).

According to any embodiment of the invention, the unit (5) comprises a joint allowing either the support part(s) (3) or the carrying part(s) (4) to pivot relative to the unit (5). According to such an embodiment, the joint may have 1, 2 or 3 degrees of freedom i.e. the joint may allow the mass (1) to pivot relative to the unit (5) in one, two or more than two directions.

According to a second aspect, the invention also relates to structure comprising a tuned pendulum mass damper as disclosed above.

According to any embodiment of the second aspect of the invention, the structure is a building, wind turbine tower, chimney or other towers or similar flexible structures.

According to any embodiment of the second aspect of the invention, the structure may be higher than 10 m or higher than 50 m, preferably higher than 100 m and sometimes higher than 300 m.

According to any embodiment of the second aspect of the invention, the pendulum mass damper may be placed within the upper 20% of the structure, normally within the upper 10% of the structure. Sometimes it will be placed at other heights.

According to any embodiment of the second aspect of the invention, the structure may be a building, a wind turbine tower, a chimney or other towers or structures e.g. having a height over 9 m.

LIST OF FIGURES

Figure 2:
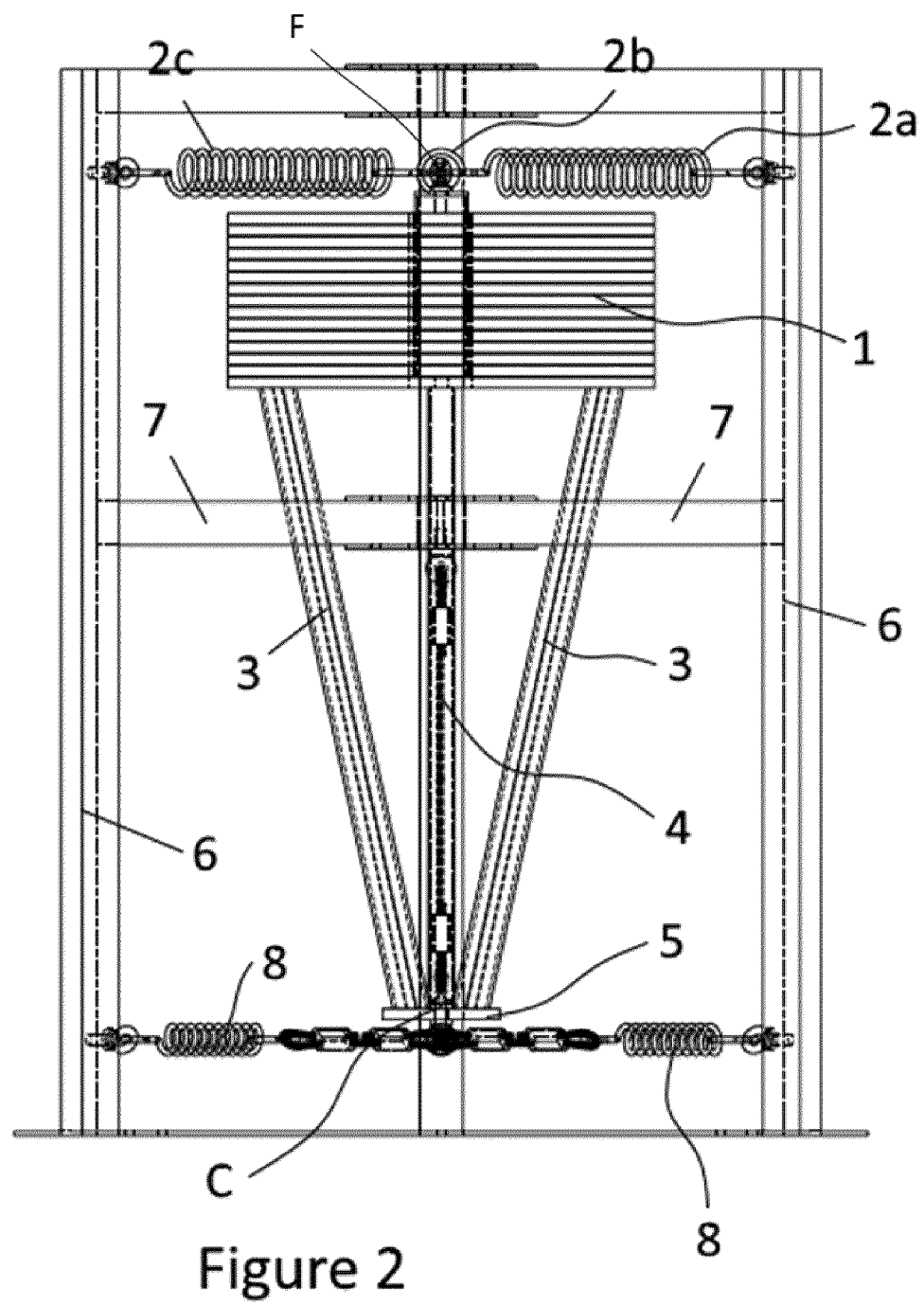
Figure 3:
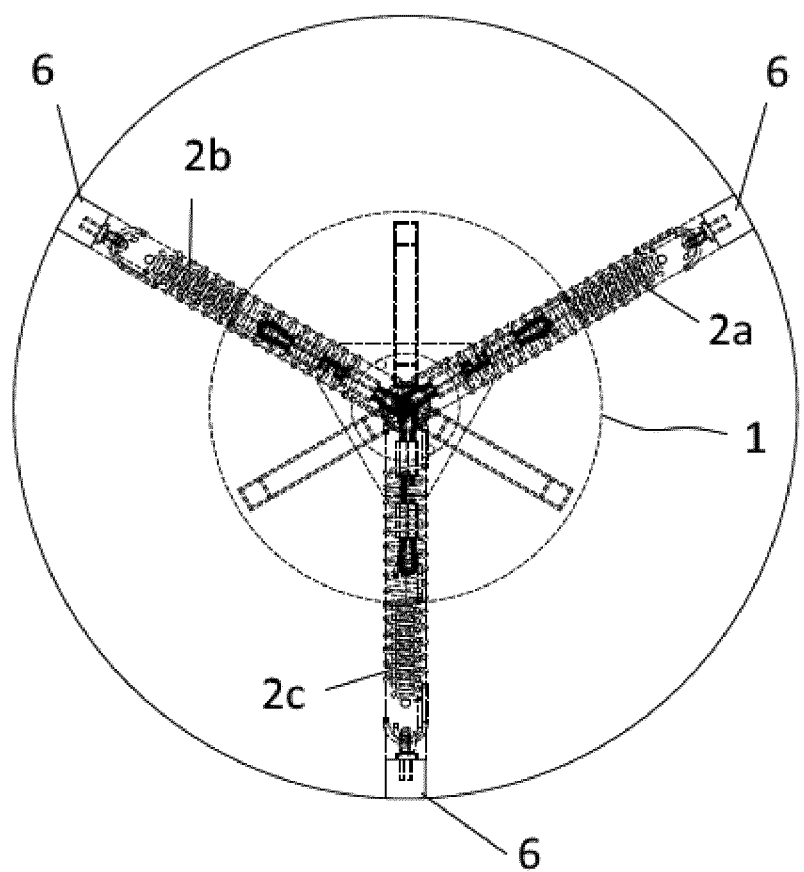
Figure 4:
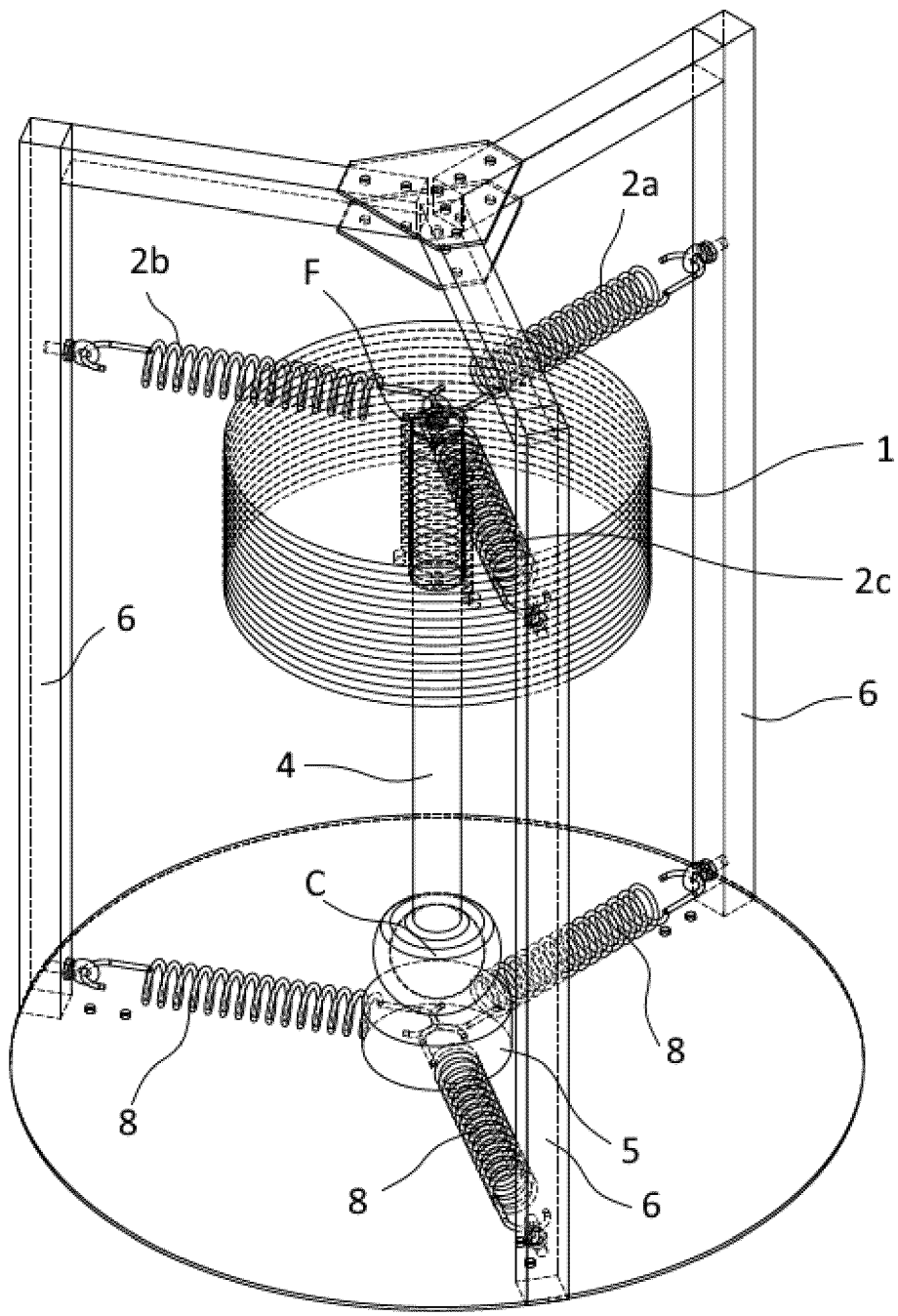
Figure 5:
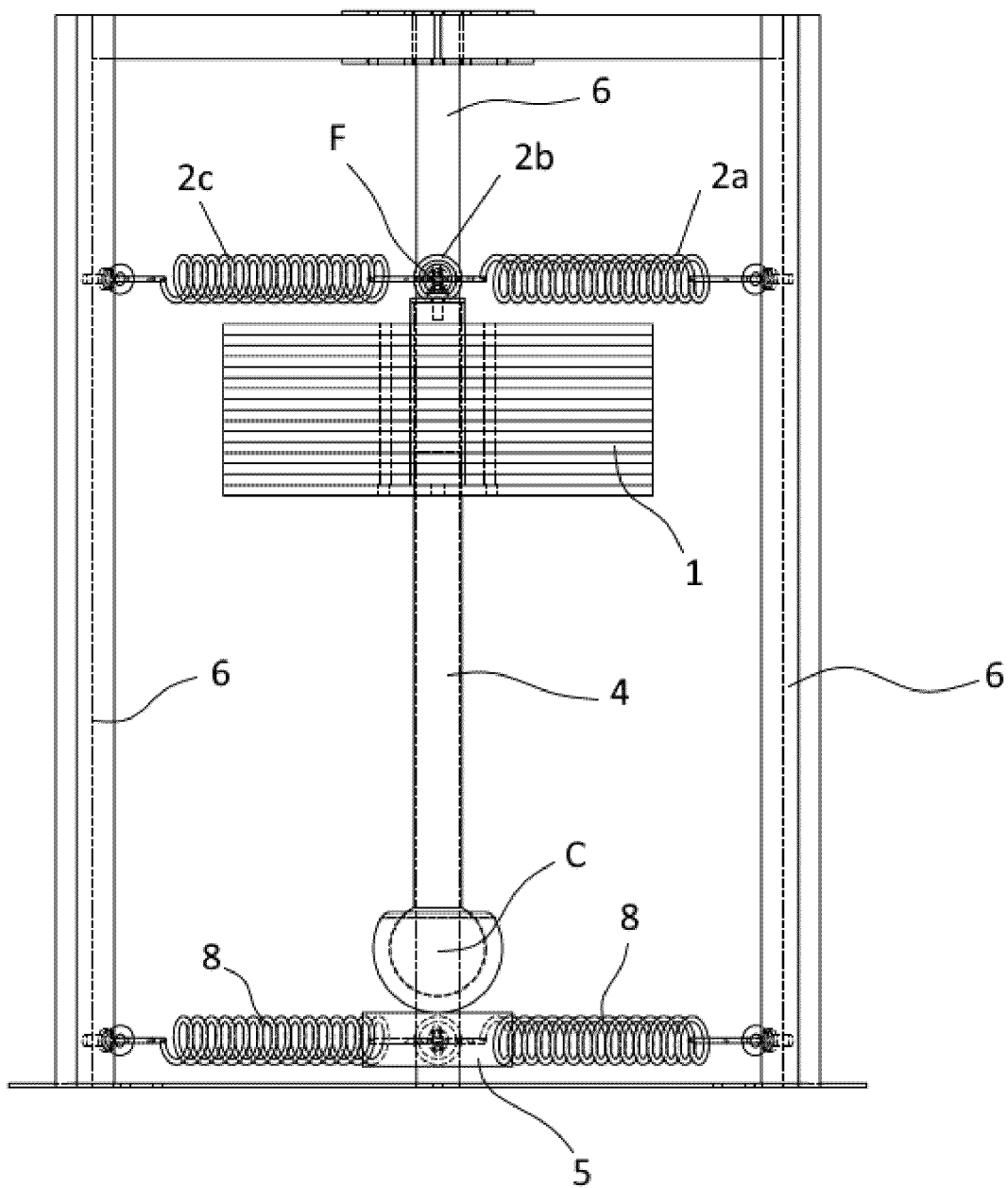
Figure 6:
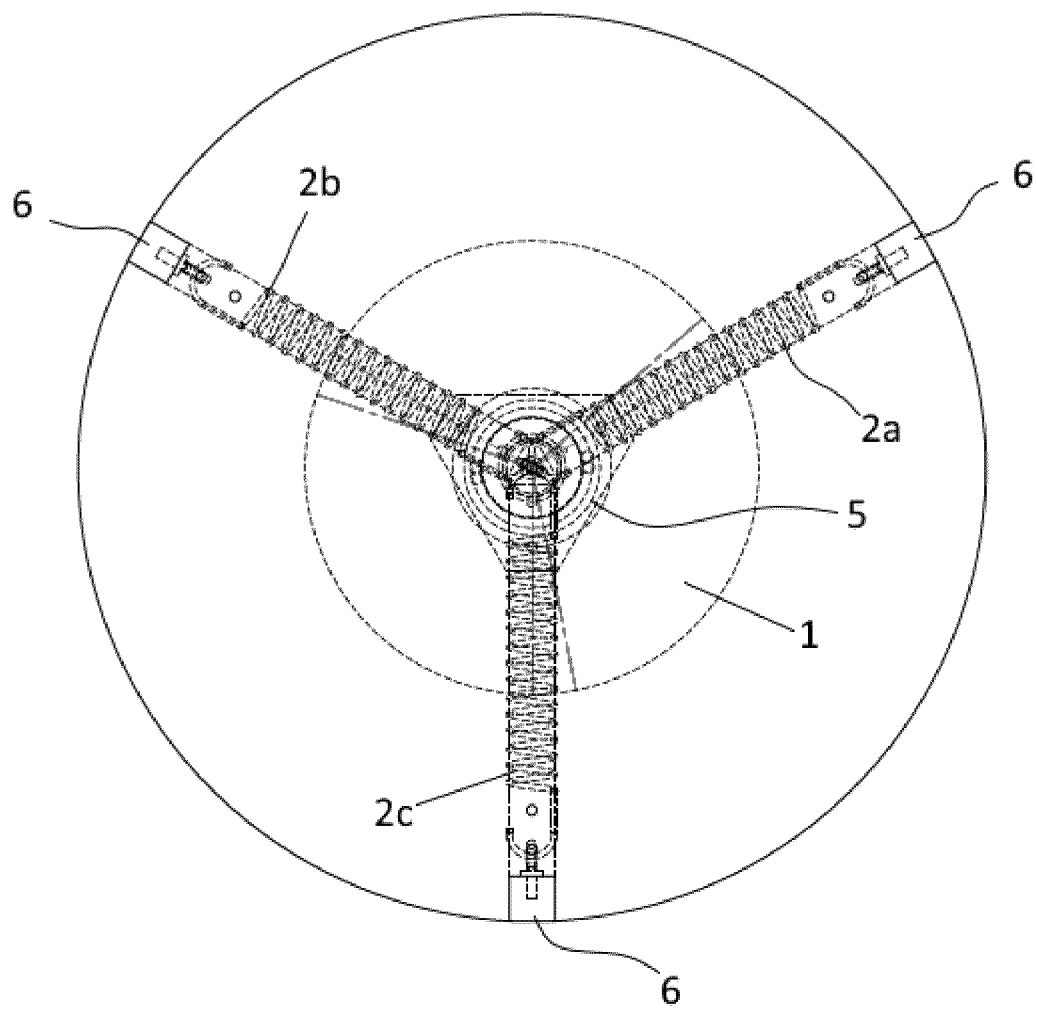

FIG. 1 discloses a first embodiment of a tuned pendulum mass damper according to the invention.
FIG. 2 discloses the first embodiment in a side view.
FIG. 3 discloses the first embodiment seen from above.
FIG. 4 discloses a second embodiment of a tuned pendulum mass damper according to the invention.
FIG. 5 discloses the second embodiment in a side view.
FIG. 6 discloses the second embodiment seen from above.
Throughout the application identical or similar elements of different embodiments are given the same reference numbers.

Definitions of Words

In general—when this expression is used in respect of a feature, the feature may be employed with any embodiment of the invention, even though the specific mentioning appears in the detailed part of the description.

DETAILED DESCRIPTION OF INVENTION

The present invention relates to a tuned pendulum mass damper, such as an inverted pendulum mass damper which may be suspended. A pendulum mass damper is characterized by that the mass moves in a spherical plane which sphere, or spherical plane is defined by a central point C.

The natural frequency of an inverted pendulum according to the present invention is not determined by the length of the pendulum as the natural frequency of an ordinary pendulum, instead the natural frequency is influenced by a spring system stabilizing the horizontal position of the mass. This makes it possible to reduce the height of the tuned mass damper making the mass damper significantly more compact while the tuned mass damper may still be able to compensate for vibrations at low frequency.

The pendulum mass damper according to the present invention should normally be installed in top of a building to perform optimally, and as a pendulum mass damper according to the invention requires minimum vertical space for installation, more space may be available on top floors compared to top floors of buildings where a traditional pendulum mass damper is installed. Contrary to a traditional gravity pendulum, the achievement of an aimed natural frequency does not necessarily involve varying the height of the mass damper. Instead, it can be obtained by adjusting damper mass and spring stiffness. Hence, pendulum dimensions may be maintained.

FIGS. 1-3 illustrates a first embodiment of the invention where the mass of the pendulum is suspended, and FIGS. 4-6 illustrates a second embodiment of the invention where the mass of the pendulum is supported by a rigid beam.

That the pendulum mass damper is suspended means that the weight of the mass of the damper is carried by a cable or a similar structure which extends from a level or point above the central point C and down to the central point C. I.e. the force keeping the mass at its vertical position is a tension or pulling force.

An inverted pendulum mass damper according to the invention may consist of simple mechanical components and bolted connections requiring only minimal maintenance during the lifetime of the device at the position of installation.

FIGS. 1-3 show a first embodiment of a pendulum mass damper according to the invention, where FIG. 1 shows an upper side view of the first embodiment, FIG. 2 shows a side view of the same embodiment and FIG. 3 shows a top view of the same embodiment. The pendulum mass damper comprises a damper mass 1 which is balanced horizontally by a first spring system comprising three springs 2a, 2b, 2c or more. The damper mass shown in FIG. 1 is of a cylindrical shape and consists of a series of smaller cylindrical masses, centrally drilled, which are installed and piled up on a vertical tube. However, the damper mass 1 may have any shape e.g. cylindrical or spherical or different, and weight, as the shape and weight of the mass are adapted to the structure in which it is desired to damp vibrations.

The first spring system is normally constituted of one or more springs positioned above, below or at the same level as the mass 1, the spring(s) of the first spring system provide a horizontal force balancing the mass and advantageously the spring(s) are mounted close to the mass 1. That the springs are mounted "close" to the mass 1 means that the length between the top of the mass 1 and the fastening point or fastening level of the springs deviates less than 20%, e.g. less than 10% or e.g. less than 5%, from the total length of the pendulum measured from the central point C to the fastening points or fastening level of the springs. The fastening point or fastening level of the springs will normally be positioned at the top of the pendulum.

In general, the spring system may comprise any number of springs, e.g. the spring system may comprise at least two springs e.g. positioned opposite each other i.e. with a distance of 180° between the springs, or at least three springs i.e. with a distance of 120° between each pair of springs or at least four springs i.e. with a distance of at least 90° between each pair of springs. Also, the springs are shown as coil or helical springs, but in general, the springs of the spring system may be of any type of compression or tension springs. The complete spring system comprising the first 2a, 2b, 2c and second 8 spring system is aimed at providing the system with the right stiffness, and thus right natural frequency. Depending on the spring system configuration the tuned pendulum mass damper can either be symmetric or not, meaning that the suspended inverted pendulum frequency may either be identical for any moving direction or may vary in a desired manner. This allows the pendulum mass damper to perform horizontally in two-dimensions for any direction of motion.

Also, the springs are shown as being positioned horizontally, but in general, springs of the first spring system may be position in an inclined position, i.e. instead of providing a force in a horizontal direction, each or part of the springs of the first spring system may provide a force in both a horizontal and in a vertical direction.

In general, a first spring system may comprise at least three springs or is at least connected to springs in three directions e.g. symmetrically distributed around the mass. The system may be provided with symmetric stiffness in all directions if the first spring system comprise of N springs, where N=3*n, for n being a positive integer.

If the first spring system comprises four springs or is balanced in four directions, the system will be stable, but the stiffness will not be symmetric.

The pendulum mass damper in FIG. 1-3 is mounted in an external frame 6, the frame 6 is attached to or is part of a structure such as a high building or tower being subjected to vibrations which vibrations would cause the structure to oscillate if no damper is present, i.e. the frame 6 does not move but is stationary relative to the structure. The pendulum mass damper further comprises one or more support part(s) 3 which helps maintaining the mass 1 in a vertical position, the support part(s) 3 are attached or fixed to the mass 1 and extends between the mass 1 and a unit 5 comprising a central point C being center of a sphere constituting a spherical plane in which the mass 1 moves. The unit 5 is positioned below the mass 1 i.e. the weight of the mass 1 is supported at a point/level below the mass 1, and the unit 5 may be understood to constitute the base of a supporting system for the mass 1.

In general, the unit 5 may be constituted of a part of the frame 6, or alternatively, the unit 5 may be constituted of a separate floating part, such as a plate or another suitable shape, being attached to the frame 6 by flexible parts e.g. a second spring system. The central point C moves together with the unit 5 changing the spherical plane in which the mass 1 moves.

According to the first embodiment, the unit 5 is a floating part attached to the frame 6 by a second spring system 8 which second spring system 8 comprises springs distributed around the unit 5. The number of springs in the second spring system may vary depending on the conditions.

In general, a pendulum mass damper according to the invention may also comprise a central carrying part 4 carrying the mass 1 and being connected to a central point C. Such a central carrying part 4 may be constituted of e.g. one or more cables or similar, or of a rigid beam. The central carrying part 4 may comprise support parts 3 forming a connection between the mass 1 and the central point C without such support parts 3 may comprise one or more rigid beams or similar part(s) extending from the mass 1 to the unit 5.

The carrying part 4 of the first embodiment is constituted of one or more cables or similar suspension means which suspension means are extending between a suspension frame 7 and the unit 5. According to the embodiment of FIG. 1-3, the suspension frame 7 comprises three beams which extend between a central point or a centrally positioned plate and the frame 6, and the carrying part 4 comprises a cable extending from the central point or plate to the unit 5.

In general, the unit 5 may comprise a joint having 1, 2 or 3 degrees of freedom i.e. the joint may allow the mass 1 and the supporting parts 3 to pivot relative to the unit 5. The unit 5 and the carrying part 4 do not pivot as the second spring system will strive to maintain a constant horizontal and vertical position of the unit 5, whereas the mass 1 and the supporting parts 3 pivot at least back and forth in one direction, possibly in two directions and possibly in three or more directions.

FIGS. 4-6 show a second embodiment of a pendulum mass damper according to the invention, where FIG. 4 shows an upper side view of the second embodiment, FIG.

5 shows a side view of the second embodiment and FIG. 6 shows a top view of the second embodiment. The pendulum mass damper comprises a damper mass 1 being balanced horizontally by a first spring system comprising three springs 2a, 2b, 2c. The damper mass shown in FIG. 4-6 is of a cylindrical shape and consists of a series of smaller cylindrical masses, centrally drilled, which are installed and piled up on a vertical tube. In general, the damper mass 1 may have any shape e.g. cylindrical or spherical or different, and any weight, as the shape and weight of the mass are adapted to the structure in which it is desired to damp vibrations.

The pendulum mass damper in FIG. 4-6 is mounted in an external frame 6, which frame 6 is attached to or is part of a structure such as a high building or tower being subjected to vibrations which vibrations would cause the structure to oscillate if no damper is present, i.e. the frame is stationary relative to the structure. The pendulum mass damper comprises a central carrying part 4 attached or fixed to the mass 1 and extending between the mass 1 and the unit 5 comprising a central point C being center of a sphere constituting the spherical plane in which the mass 1 moves. The unit 5 is positioned below the mass 1 i.e. the weight of the mass 1 is supported at a point/level below the mass 1, and the unit 5 may be understood to constitute the base of a supporting system for the mass 1. The unit 5 of the second embodiment may comprise a ball joint and the carrying part 4 may then comprise a ball-shaped end part supported by this joint. In general, the unit 5 may comprise any joint allowing movement in all directions.

The unit 5 may comprise a lower surface provided with wheels or other means adapted to slide over a contact surface of the structure or a frame fixed to the structure, and the unit 5 may be attached to a frame 6 of the structure by a second spring system 8 as described in connection with the first embodiment. The stiffness configuration of the second spring system 8 is important for the performance of the damper according to this embodiment. The number of springs and the stiffness can be changed in the same way as the springs of the first spring system.

In general, the unit 5 may comprise a joint having 1, 2 or 3 degrees of freedom i.e. the joint may allow the mass 1 and the supporting parts 3 to pivot relative to the unit 5.

As the natural frequency of the system does not only depend on the length of the system but on a variety of different parameters the pendulum mass damper becomes versatile, and adoptable to damp the dynamic response of a variety of slender structures, such as high-rise buildings and wind turbine towers having a natural frequency within the range [0.05; 0.3] Hz (equivalent to a wire length of a traditional pendulum in the range [99; 2.8] m). This band represents only a sub-group of frequencies which the damper is meant for and the frequency can be regulated according to the application purpose.

According to the theoretical model which the invention is based on, the pendulum mass damper according to the invention would, in principle, be capable of acting for infinitesimally small frequencies.

When e.g. the wind-induced vibrations hit the natural frequency of the inverted pendulum, the mass 1 starts to oscillate around the center C of the unit 5 placed at the base of the supporting system. The mass will either pivot around the point C or even further below.

| Ref. no. | Ref. name |
|---|---|
| 1 | Mass |
| 2a, 2b, 2c | Spring system |
| 3 | Support parts supporting the mass |
| 4 | Central carrying part carrying the mass |
| 5 | Unit positioned below the carrying part 4 |
| 6 | External frame for mass damper |
| 7 | Suspension frame for carrying part 4 |
| 8 | Second spring system defining horizontal position of unit 5 |
| C | Point defining the center of a spherical plane in which the mass of the pendulum moves |
| F | Point or level at which the first spring system is fastened to central axis |

The invention claimed is:

1. A pendulum mass damper for damping oscillations of a structure, the pendulum mass damper comprising a mass (1) balanced by a first spring system (2a, 2b, 2c) that balances the mass (1) horizontally and is positioned above or at substantially a same vertical level as the mass (1), wherein the mass is supported by a carrying part (4) to maintain a vertical position, the carrying part (4) carrying the mass (1) in the vertical direction extends between the mass (1) and a position (C) below the mass (1), and therefore the weight of the mass (1) is carried or supported from or at a point or level below the mass (1), such that the mass (1) at the position (C) below the mass is connected to a unit (5) constituting a base of a supporting system for the mass (1), the unit (5) balanced by flexible parts (8) such that the unit (5) can move either horizontally or both horizontally and vertically.

2. The pendulum mass damper according to claim 1, wherein the unit (5) is constituted of a floating part.

3. The pendulum mass damper according to claim 1, wherein the carrying part (4) comprises a central carrying part (4) extending from a suspension frame (7) to the position (C).

4. The pendulum mass damper according to claim 1, wherein the first spring system (2a, 2b, 2c) balances the mass (1) horizontally and is attached at the central axis above the vertical level of the mass (1) within a distance of the top of the mass being less than 20%, or being less than 10% or being less than 5%, from the total length of the pendulum measured from a central point (C) to the fastening points or fastening level (F) of the springs.

5. The pendulum mass damper according to claim 1, wherein the first spring system (2a, 2b, 2c) comprises at least three springs or at least balances the mass in three directions.

6. The pendulum mass damper according to claim 1, the carrying part (4) comprises a central carrying part (4) in form of one or more cables or similar extending from a suspension frame (7) to the position (C).

7. The pendulum mass damper according to claim 1, wherein the carrying part (4) also comprises support parts (3) extending from the mass (1) to the unit (5) positioned below the mass (1).

8. The pendulum mass damper according to claim 1, wherein the unit (5) comprises a joint allowing either the support part(s) (3) or the carrying part(s) (4) to pivot relative to the unit (5).

9. The pendulum mass damper according to claim 8, wherein the joint has one, two or three degrees of freedom i.e. the joint may allow the mass (1) to pivot relative to the unit (5) in one, two or more than two directions.

10. A structure comprising the pendulum mass damper according to claim 1.

11. The structure according to claim 10, wherein the structure is a building, wind turbine tower, or chimney.

12. The pendulum mass damper according to claim 1, wherein said flexible parts (8) comprise a second spring system.

13. The pendulum mass damper according to claim 12, wherein the second spring system (8) comprises at least three springs.

14. The pendulum mass damper according to claim 1, wherein the pendulum mass damper comprises one mass (1) balanced by the first spring system (2a, 2b, 2c).

* * * * *